United States Patent [19]

Holmes et al.

[11] Patent Number: 5,286,276

[45] Date of Patent: Feb. 15, 1994

[54] QUENCHING SYSTEM TO PREVENT LOSS OF FLUIDITY IN A REACTION VESSEL

[75] Inventors: Paul Holmes; Stephen M. Jones, both of Cleveland, England

[73] Assignee: Tioxide Group Services Limited, London, England

[21] Appl. No.: 940,993

[22] Filed: Sep. 4, 1992

[30] Foreign Application Priority Data

Sep. 9, 1991 [GB] United Kingdom ............ 9119205

[51] Int. Cl.$^5$ ............................................ C21D 11/00
[52] U.S. Cl. ........................................ 75/375; 266/89; 266/90; 266/266
[58] Field of Search ............... 75/375; 266/89, 90, 266/266

[56] References Cited

U.S. PATENT DOCUMENTS

| | | | |
|---|---|---|---|
| 3,018,170 | 1/1962 | Soloducha | 23/260 |
| 4,188,021 | 2/1980 | Patuzzi et al. | 266/89 |
| 4,269,619 | 5/1981 | Keil et al. | 266/44 |
| 4,592,537 | 6/1986 | Pfaffmann et al. | 266/90 |
| 4,663,131 | 5/1987 | Gerken et al. | 423/82 |
| 4,690,800 | 9/1987 | Nardi et al. | 420/40 |
| 4,846,080 | 7/1989 | Ross et al. | 266/266 |

FOREIGN PATENT DOCUMENTS

| | | |
|---|---|---|
| 0147608 | 11/1984 | European Pat. Off. . |
| 3818420 | 12/1989 | Fed. Rep. of Germany . |
| 0677172 | 2/1950 | United Kingdom . |
| 0796856 | 10/1955 | United Kingdom . |
| 0796857 | 10/1955 | United Kingdom . |
| 1094029 | 10/1966 | United Kingdom . |

*Primary Examiner*—Upendra Roy
*Attorney, Agent, or Firm*—Baker & Botts

[57] ABSTRACT

A quench system which can be used to quench a continuous reaction such as the continuous digestion of titaniferous ores with sulphuric acid is provided. The quench system comprises a pressure vessel (1) equipped with a full bore outlet valve (5) connected to a reaction vessel (7) which may require quenching. The pressure vessel is partly filled with a liquid (18) and the ullage is occupied by a gas under pressure, the pressure being sufficient to discharge the liquid through the outlet valve (5) when open. The reaction vessel is equipped with means to detect cessation of stirring therein or power failure and the full bore valve is equipped with means (19) to open when cessation of stirring or power failure is detected.

Operation of the quench system enables a reaction to be rapidly cooled and diluted to prevent solidification and the problems associated therewith in the event of the reactants being unstirred.

9 Claims, 1 Drawing Sheet

QUENCHING SYSTEM TO PREVENT LOSS OF FLUIDITY IN A REACTION VESSEL

Background of the Invention

1. Field of the Invention

This invention relates to a quench system for reactors and particularly to those reactors for use in vigorous chemical reactions.

2. Description of the Background

Some chemical reactions involve reactants that require constant agitation to prevent reactants forming a solid, unhandlable mass. Should an agitator or stirrer fail to continue to agitate or stir as a result of either mechanical or electrical failure then an otherwise fluid reaction medium may become solid within an extremely short time resulting in wastage of expensive reactants and much manual labour needed to empty large reactors. This is particularly disadvantageous in continuous chemical processes involving constant addition of raw materials to a reactor and constant removal of reaction products. In extreme cases the operation of a whole manufacturing unit can be caused to be shut down. Setting of a reaction mixture to a solid can be prevented in some cases if the reaction mixture can be cooled sufficiently rapidly, i.e. quenched.

SUMMARY OF THE INVENTION

A quench system has now been developed which will effect quenching of a chemical reaction to reduce the likelihood of solidification in the event of a failure of an agitator or stirrer for any reason.

DESCRIPTION OF THE INVENTION

Figure 1:
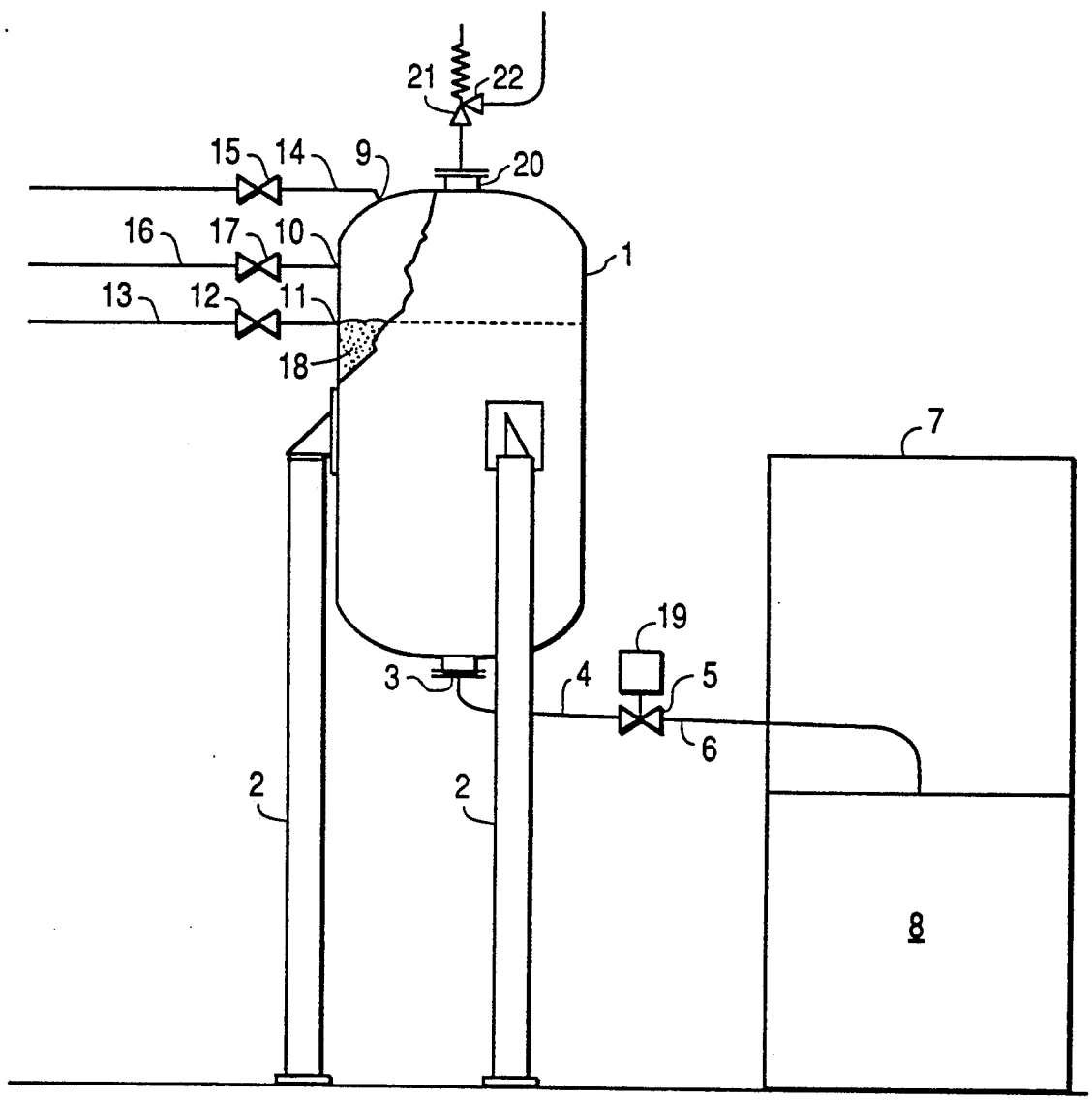
FIG. 1 is an outline diagrammatic drawing of the quench vessel and process reactor arrangement.

According to the present invention a quench system for a chemical reaction comprises a quench pressure vessel having a full bore outlet valve in the base of the vessel connected to a reaction vessel by a connecting pipe, liquid contained in the quench pressure vessel in an amount insufficient to fill the vessel thereby creating ullage, gas in said ullage at a pressure greater than atmospheric pressure and sufficient to discharge liquid from said vessel through said outlet valve when open, means to detect cessation of stirring of reactants in said reaction vessel or power failure and means to open said valve in response to the detection of cessation of stirring or power failure.

The invention also includes a process of quenching a continuous chemical reaction in which liquid is fed to the reaction vessel by the quench system of the immediately preceding paragraph.

The quench system is of most use in the quenching of the continuous digestion of a titanium bearing ore by an acid such as concentrated sulphuric acid. In such a process reaction of the ore and the sulphuric acid at an elevated temperature produces a titanium sulphate/iron sulphate complex which sets solid when agitation ceases unless the reaction is stopped very quickly. Loss of fluidity must be prevented otherwise a major blockage of the continuous reactor occurs.

The quency vessel will have a size sufficient to contain the desired amount of liquid to effect the quenching of the reaction and gas under pressure to expel the liquid at a sufficient rate to effect quenching in the desired time. Pressure vessels with a capacity of from 1.5 to 4 cubic meters, preferably from 2 to 3 cubic meters have been found to be of use. Typically, the vessel has a single centre outlet in the base which outlet is sealed by a full bore valve, usually a ball valve, either located in the outlet itself or in a pipe from the outlet to the reaction vessel.

The full bore valve has means associated therewith to open the valve and conveniently this can be effected by a compressed gas device e.g. air actuated, in response to a signal from a suitable control system occasioned by the cessation of agitation or a failure of a power supply to an agitator. Typically opening of the full flow valve will be initiated by a low-voltage, low current signal from the back-up power supply which is fed to a solenoid pilot valve to admit compressed air to the opening means of the valve.

The quench vessel has inlets for quenching liquid and gas under pressure and these or their associated pipework have sealing valves to enable the quench vessel to be maintained closed in a state of readiness.

A safety relief valve and pressure transducer can also be fitted to the quench vessel to ensure safe operation and detection of any loss of pressure when maintained in a state of readiness.

The outlet pipe conveying liquid from the quench vessel to the reactor is preferably kept as short as conveniently possible to reduce loss of rate of flow of liquid due to fluid friction.

In use a quench vessel having a volume of 2.1 cubic meters, for example, would be charged with about 1.5 cubic meters of liquid and compressed gas in the remaining 0.6 cubic meters ullage. The pressure of the gas would usually be that of the standard supply and this would normally be at least 5.5 bars, although this pressure is not a limiting factor. After charging with liquid and compressed gas the vessel is sealed to expel the liquid when required on opening of the full flow valve.

The amount of gas in the vessel should be such as to expel the whole of the volume of liquid in desired time even when the gas is expanding during expulsion of the liquid.

In a chemical or other factory employing a plurality of reactors then each reactor will have its own associated quench vessel.

In operation the maximum rate of flow of quench liquid is obtained initially when most desired to achieve the greatest quenching effect. Prevention of setting solid minimises lost production time in restarting the process when power is restored or mechanical failure repaired. Labour costs for digging out solid materials are avoided and there is less damage caused to agitators and vessels.

The quench system can be operated with any combination of gas and liquid providing they do not interreact but the use of air and water minimises environmental damage

EXAMPLE

One form of quench system will now be described by way of example only with reference to the accompanying drawing in which:

FIG. 1 is an outline diagrammatic drawing of the quench vessel and process reactor arrangement.

In FIG. 1 a quench vessel 1 is shown mounted on legs 2. At the base of the vessel is an outlet 3 connected by pipe 4 to a full flow ball valve 5 and via pipe 6 to a process reactor 7. In the process reactor 7 a reaction mixture 8 is present such as a mixture of ilmenite and concentrated sulphuric acid. The process reactor 7 has inlets for supplies of raw materials and an outlet for reaction products but these are not shown.

The quench vessel 1 has an inlet 9 for compressed air, an inlet 10 for water and an outlet 11 connected to valve 12 and overflow/vent pipe 13. Air inlet 9 has an inlet pipe 14 and valve 15. Water inlet 10 also has an inlet pipe 16 fitted with a valve 17.

In use the quench vessel 1 is filled with water 18 to the level of outlet 11. Valves 12 and 17 are closed, compressed air is introduced through inlet 9 and valve 15 is closed. When cessation of stirring in reactor 7 is detected or a power failure occurs, valve 5 is opened by actuator 19 supplied by standby compressed air. Water 18 is expelled rapidly from vessel 1 into the reaction mixture 8 and solidification of the reaction mixture is prevented.

Vessel 1 has a port 20 fitted with pressure relief valve 21 and pressure transducer 22 which enables the pressure in the ullage to be monitored.

We claim:

1. A quench system for a chemical reaction comprising a quench pressure vessel and a reaction vessel, the quench pressure vessel having a base which is equipped with a full bore outlet valve, the outlet valve being connected to the reaction vessel by a connecting pipe, the quench pressure vessel containing an amount of a liquid said amount being insufficient to fill the quench vessel thereby creating ullage said ullage containing a gas at a pressure greater than atmospheric pressure and said pressure being sufficient to discharge said liquid from said quench vessel through said outlet valve when open, the quench system being equipped with means to detect cessation of stirring of reactants contained in said reaction vessel or power failure and said outlet valve being equipped with means to open the outlet valve in response to detection of cessation of stirring or power failure.

2. A quench system according to claim 1 in which the quench pressure vessel has a capacity of from 1.5 to 4 cubic meters.

3. A quench system according to claim 2 in which the capacity is from 2 to 3 cubic meters.

4. A quench system according to claim 1 in which the quench pressure vessel has a single centre outlet in the base.

5. A quench system according to claim 1 in which the full bore outlet valve is a ball valve.

6. A quench system according to claim 1 in which the means to open the full bore outlet valve is a compressed gas device.

7. A quench system according to claim 1 in which the quench pressure vessel is equipped with inlets for quenching liquid and gas under pressure, the inlets having sealing valves to enable the quench pressure vessel to be maintained closed in a state of readiness.

8. A quench system according to claim 1 in which the quench pressure vessel is equipped with a pressure transducer to detect loss of pressure of the gas in the ullage.

9. A quench system according to claim 1 in which the gas is air and the liquid is water.

* * * * *